(No Model.) 12 Sheets—Sheet 1.
P. MILES.
MACHINE FOR MAKING WARDROBE HOOKS.

No. 452,715. Patented May 19, 1891.

(No Model.) 12 Sheets—Sheet 2.

P. MILES.
MACHINE FOR MAKING WARDROBE HOOKS.

No. 452,715. Patented May 19, 1891.

Attest:
Philip F. Larner
Howell Battle

Inventor:
Purches Miles
By Macword
Attorney (No Model.) 12 Sheets—Sheet 3.

P. MILES.
MACHINE FOR MAKING WARDROBE HOOKS.

No. 452,715. Patented May 19, 1891.

Attest:
Philip F. Larner
Howell Bartle

Inventor:
Purches Miles
By Wm C Ward
Attorney

(No Model.)  
12 Sheets—Sheet 4.

P. MILES.
MACHINE FOR MAKING WARDROBE HOOKS.

No. 452,715.  
Patented May 19, 1891.

Attest:  
Philip F. Larner  
Howell Bartle Inventor:  
Purches Miles  
By [signature]  
Attorney (No Model.) 12 Sheets—Sheet 5.
P. MILES.
MACHINE FOR MAKING WARDROBE HOOKS.

No. 452,715. Patented May 19, 1891.

Attest:
Philip F. Larner
Howell Bartle

Inventor:
Purches Miles
By McLeod
Attorney (No Model.) 12 Sheets—Sheet 6.

P. MILES.
MACHINE FOR MAKING WARDROBE HOOKS.

No. 452,715. Patented May 19, 1891.

Attest:
Philip F. Larner
Howell Shutt

Inventor:
Purches Miles
By McSwood
Attorney

(No Model.) 12 Sheets—Sheet 7.
P. MILES.
MACHINE FOR MAKING WARDROBE HOOKS.
No. 452,715. Patented May 19, 1891.

(No Model.) 12 Sheets—Sheet 8.
P. MILES.
MACHINE FOR MAKING WARDROBE HOOKS.

No. 452,715. Patented May 19, 1891.

Attest:
Philip F. Larner
Howell Little

Inventor:
Purches Miles
By
Attorney.

(No Model.) 12 Sheets—Sheet 9.

P. MILES.
MACHINE FOR MAKING WARDROBE HOOKS.

No. 452,715. Patented May 19, 1891.

Attest:
Philip F. Larner
Lowell Larte

Inventor:
Purches Miles
By M. B. Hood
Attorney (No Model.) 12 Sheets—Sheet 10.
P. MILES.
MACHINE FOR MAKING WARDROBE HOOKS.
No. 452,715. Patented May 19, 1891.

Attest:
Philip F. Larner
Nowell Bartt

Inventor:
Purches Miles
By [signature]
Attorney.

(No Model.) 12 Sheets—Sheet 11.
P. MILES.
MACHINE FOR MAKING WARDROBE HOOKS.

No. 452,715. Patented May 19, 1891.

Attest:
Philip F. Larner
Howell Castle

Inventor:
Purches Miles
By
Attorney.

(No Model.) 12 Sheets—Sheet 12.
P. MILES.
MACHINE FOR MAKING WARDROBE HOOKS.

No. 452,715. Patented May 19, 1891.

Attest:
Philip F. Larner
Nowell Bartle

Inventor:
Purches Miles
By McBryde
Attorney

UNITED STATES PATENT OFFICE.

PURCHES MILES, OF BROOKLYN, NEW YORK.

MACHINE FOR MAKING WARDROBE-HOOKS.

SPECIFICATION forming part of Letters Patent No. 452,715, dated May 19, 1891.

Application filed July 31, 1890. Serial No. 360,553. (No model.)

*To all whom it may concern:*

Be it known that I, PURCHES MILES, of Brooklyn, in the county of Kings and State of New York, have invented a certain new and useful Machine for Making Wardrobe-Hooks; and I do hereby declare that the following specification, taken in connection with the drawings furnished and forming a part of the same, is a clear, true, and complete description of my invention.

Although said machine was devised with special reference to the manufacture of such double-wire wardrobe-hooks as were devised and disclosed in Letters Patent issued to me, No. 280,062, dated June 26, 1883, it is in part capable of use, with appropriate variations in its dies and their actuating mechanism, for the manufacture of such single-wire hooks as were also devised by myself and disclosed in my Letters Patent, No. 280,388, dated July 3, 1883. These hooks, whether double or single, are provided with straight shanks screw-threaded at their tips, a tip being one terminal of the piece of wire employed, the other terminal being in the form of an eye which embraces the shank adjacent to its threaded tip, said terminals being at right angles to each other. In the double hook the upper or top hook is longer than the lower or bottom hook, but both are in the same vertical plane, and the portion of the wire in each hook is doubled upon itself, but with ample intervening spaces to afford desirable symmetry, as well as requisite supporting strength. These hooks are formed from wire previously cut into straight pieces, each long enough for one hook, and preferably these pieces are first made into blanks screw-threaded at one end and at the opposite end provided with a slight bend as an initial step toward forming the terminal eye before referred to. These "wire blanks," as they may be termed, are converted into finished hooks by progressively bending the wire until the two ends thereof stand at right angles to and cross each other, whereupon the terminal eye is formed by bending a portion of the wire around the shank, and the finished hook is then discharged from the machine.

After describing the mechanism illustrated in the drawings the features deemed novel will be specified in the several clauses of the claim hereunto annexed.

Referring to the drawings, Figure 1 in side and end views illustrates such a double-wire wardrobe-hook as is produced on my machine. Fig. 2 in two views illustrates the wire blank from which said hook is formed. Figs. 3, 4, and 5 illustrate the blank in three progressive stages. Fig. 6 is an end view of the blank Fig. 5, this being its form next preceding the two operations which completely form the upper hook, as shown in dotted lines in Fig. 5, after which the eye is formed as the final operation.

Figures 1, 2, 3, 4, 5, 6:
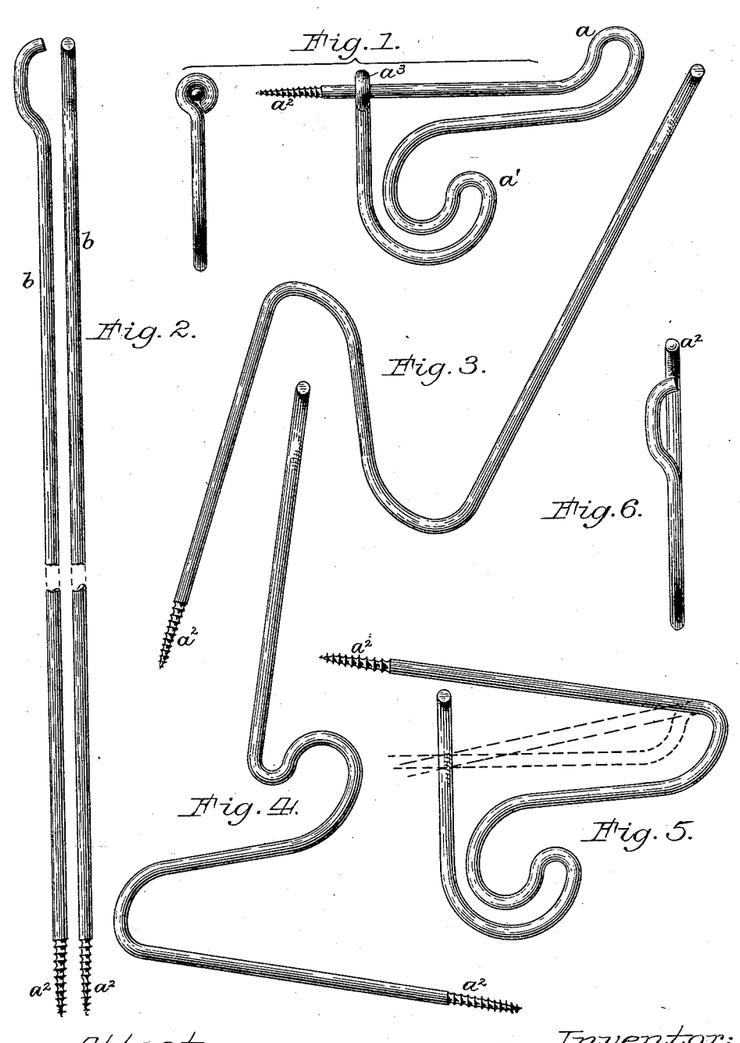

It is to be understood that, although my machine has been devised with special reference to the manufacture of the double wardrobe-hook shown in Fig. 1, other hooks of somewhat varied form can be made on this machine if corresponding variations be made in the dies, their actuating mechanism, and the head-block. The hook shown in Fig. 1 has what I will term the "upper hook" $a$, the "lower shorter hook" $a'$, the "screw-threaded tip" $a^2$, and the "terminal eye" $a^3$, which embraces the shank near the tip. For the purposes of this specification I will term the two nearly horizontal portions of wire which constitute the shank of the hook and the immediately underlying portion of wire the "arm" or "main arm" of the hook, and I will also term the vertical portion of the wire below the eye $a^3$ the "base" of the hook, and the outline of the space inclosed by the wire I will term the "interior contour" of the hook.

The wire blank $b$ of Fig. 2 is of the precise length required to form the double hook, and at one end it is bent somewhat for facilitating the formation of the terminal eye $a^3$. This blank $b$ is changed by the first bending operation in the machine to the form shown in Fig. 3, and then to the form shown in Fig. 4 by the second bending operation. The third bending operation imparts the form shown in Fig. 5. The results of the fourth bending operation are indicated by the dotted lines in Fig. 5, and the result of the fifth bending, for forming the terminal eye, is clearly shown in Fig. 1.

Figures 7, 8, 11:
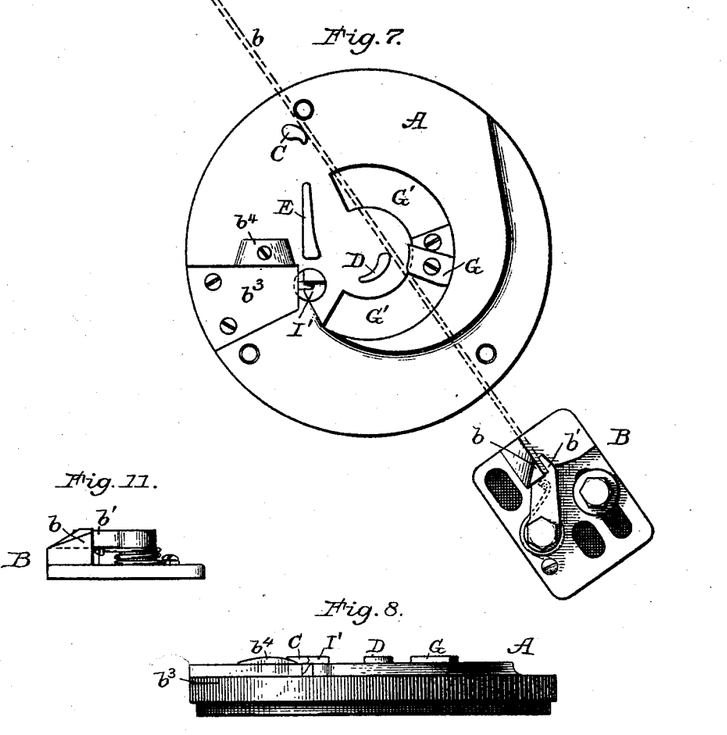
Fig. 7 in plan or top view illustrates what I will term the "head-block" of the machine, at and upon which the double hooks are formed, a wire blank being shown in dotted lines in its initial position.
Fig. 8 is a side view of the head-block.
Fig. 11 is a side view of the co-operating gage shown in top view in Fig. 7, by which the eye end of a blank is properly located.
Figure 9:
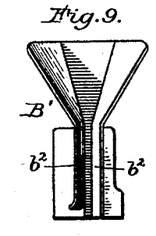
Figs. 9 and 10 in front end and side view illustrate one of the gages shown in top view in Fig. 7, by which the tip of a wire blank may be accurately located in presenting the blank to the head-block.
Figure 10:
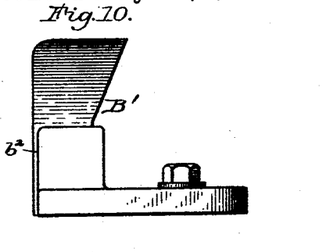

In Fig. 7 the head-block A of my machine is shown in top or plan view, and those parts thereon or portions thereof which are relied upon for duty and the parts which coöperate therewith will be described in connection with the several progressive operations involved in forming the hook.

At the outset the blank $b$ must be accurately located with respect of the head-block and the abutment-dies thereon, and this is accomplished by means of a gage constructed in two parts B and B', which, although separate devices, really operate as one gage. The gage or gage part B consists of a stationary jaw $b$, having a beveled top, and a spring-jaw $b'$, which lightly clasps the eye end of the blank when the latter is pressed endwise and downward between the jaws. The jaw $b'$ has a lateral shoulder, against which said end abuts when the blank is dropped parallel with and upon the head-block, thus providing for a precise endwise adjustment of the blank. This gage or gage part is mounted on a base which is slotted and provided with bolts, by which it is adjustably secured to an appropriate portion of the top plate of the machine. The spring-jaw $b'$ permits the end of the wire held by it to be freely moved laterally away from the stationary jaw during the initial bending operation. The gage or gage part B' is at the diametrically-opposite side of the head-block, and it is hopper or funnel shaped, having a flaring end and sides $b^2$ and a narrow interior, and it is open at one side of its base to permit the tip end $a^2$ of a blank to freely pass out laterally therefrom and in a direction opposite to that permitted by the spring-jaw $b'$ during the first bending operation. This gage part is also mounted on a slotted plate and provided with a bolt for adjustably securing it to the top plate of the machine. When a blank has been thus located by said gage or gages, its lies diametrically across the head-block and in close contact with two abutment-dies or "formers" C and D, which project above the surface of the head-block, and they may be detachable therefrom or integral therewith. The abutment-die C, near the periphery of the head-block, is one which occupies space within the upper hook $a$, Fig. 1, and it serves as a former against and around which the wire is bent for developing the outer end of the arm of said upper hook. The abutment-die D is located near the center of the head-block, and it is the one which occupies a portion of the interior space of the lower portion of the lower hook, and it partially determines the interior contour thereof. Another abutment-die E is located to the one side of the die D and in proper relation to the die C to enable it to serve as a former in the space between the wire comprising the straight shank of the hook and the parallel underlying portion of the hook, and it therefore determines the interior contour of a portion of the arm of the hook. It is to be understood that these several abutment-dies might be connected in appropriate curved and straight lines, so as to constitute one solid projection above the surface of the head-block; but it will be obvious that in that case the only effective or essential portions of the die would be those located at the points respectively occupied by the abutments C, D, and E.

Figures 12, 13, 14:
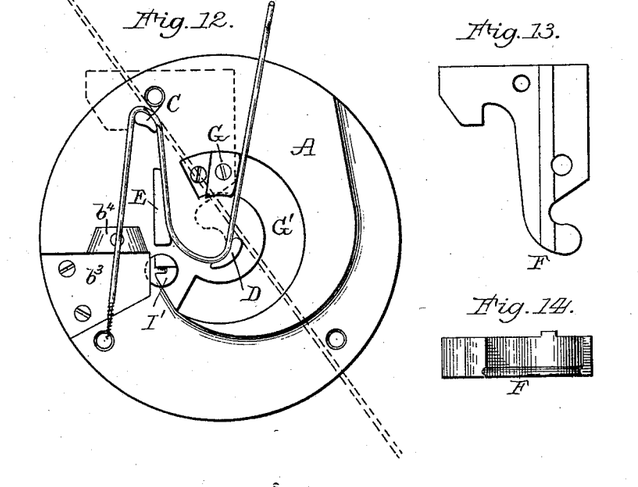
Fig. 12 is a plan view of the head-block having thereon a wire blank as it appears after the first bending operation.
Figs. 13 and 14 in top and front end view illustrate the reciprocating bending-die, which executes the first operation.
Figure 16:
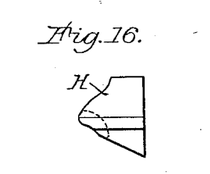
Figs. 16 and 17 illustrate in top and edge view the reciprocating die by which the second bending operation is performed. Said die also operates passively as an abutment-die or former.
Figure 17:
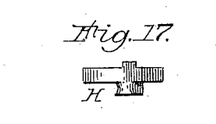

The wire blank occupying the position shown in Fig. 7 is first bent into the form shown in Figs. 3 and 12 by a sliding die F, Figs. 13 and 14, which moves toward the center of the head-block, bends the wire partially around the abutment-die C against the abutment-die D, and also against and parallel with one side of the abutment-die E, thus completing the first bend, said die F then remaining in that position to serve at its rounded end as an abutment-die. When the wire is in this form, the eye end of the blank lies against the end of die F and against one side of another movable die G, (also shown in Figs. 18, 19, 20, and 21,) which serves first as an abutment-die and then as a bending-die, which may be termed a "wiper," because it moves to and fro in a circular or curved path in a curved slot G' in the head-block. The second bend, for putting the blank into the shape shown in Figs. 4 and 15, is effected by another sliding die H, Figs. 16 and 17, which moves in a path at right angles to the path of the die F and operates first as a bending-die and then as an abutment-die.

Figure 15:
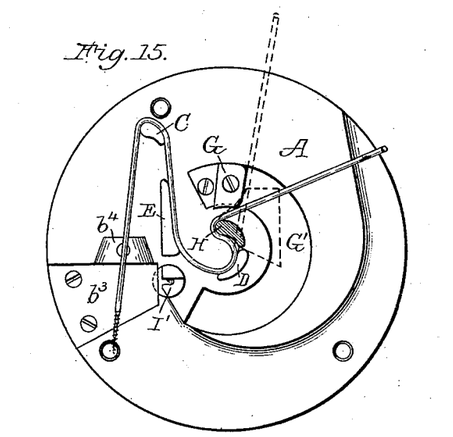
Fig. 15 is a plan view of the head-block having thereon a blank as it appears after the second bending operation.

In moving toward the center of the head-block the die H engages with the wire of the blank lying between the end of die F and the wiper-die G, both of which dies then operate as abutment-dies, and consequently when said die H has completed its inward movement the blank is bent into the form indicated in said Figs. 4 and 15, after which the die H remains at rest to serve as an abutment-die or former, co-operating with the abutment-die D for developing the interior contour of the lower hook $a'$. The wiper or bending die G then moves in its curved path, bending the eye end of the wire around and in close contact with the outer curved surfaces of the dies H and D until said eye end of the wire stands nearly at right angles to the tip end of the wire, the blank then being in the form indicated in Figs. 5 and 18 and the die G being at rest. It will be understood that before the die F commences its bending operation the wiper-die G occupies a position at about the middle of its path, as shown in Fig. 7, and that the sliding die F is recessed underneath at one side to afford space for said die G, and also that as said die F moves forward the die G moves toward one end of its path to a position partially beneath the die F, as indicated in Fig. 12, so that it is then in proper position to operate as an abutment-die, as indicated in Fig. 15, and its passage around outside of the dies D and H is unobstructed, because of a space beneath a portion of the die H and back of that portion thereof which engages with the wire.

Figures 18, 19:
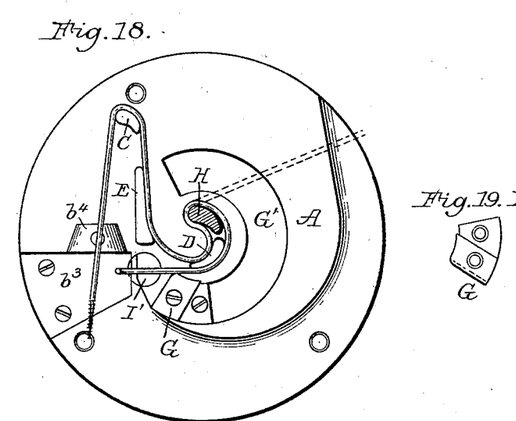
Fig. 18 is a plan view of the head-block with a blank thereon after the third bending operation.
Figs. 19, 20, and 21 illustrate in top, edge, and bottom views the "wiper," which performs the third bending operation and reciprocates in a curved path afforded by a curved slot in the head-block.
Figures 20, 21:
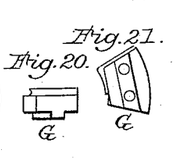
Figure 22:
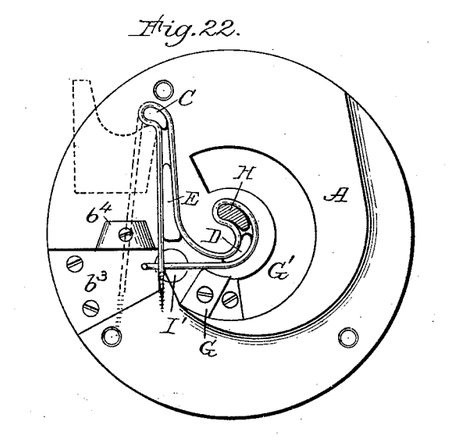
Fig. 22 is a plan view of the head-block with a blank thereon at the close of the fourth bending operation and the almost simultaneous formation of the eye and completion of the hook.
Figure 23:
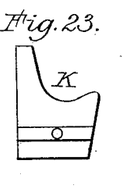
Figs. 23 and 24 in top and edge views illustrate the reciprocating die which executes the fourth bend.
Figure 24:
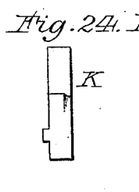

With the blank developed into the form shown in Figs. 5 and 18 the next step is to firmly clamp the wire preparatory to forming the terminal eye $a^3$. This is performed by the vertically-reciprocating clamp I, Figs. 22 and 25 to 28, inclusive, which co-operates with a clamping-base I', securely seated in the head-block. The clamp and its base are provided with coincident vertical concave faces, as clearly shown in Fig. 25, which are occupied by the wire during the forming of the eye, and it will be seen that the preliminary bend shown in the wire blank, Fig. 2, affords a shoulder which, when seated in the concave face of the base I' and with the clamp I firmly bearing downward on top of the wire at the rear of said bend, provides for a complete resistance to the heavy thrusting force necessary for turning the end of the wire upon itself in forming the terminal eye. After the clamp I has entered upon its duty it is then necessary to move the tip end $a^2$ of the blank so that it will lie crosswise of that portion of the wire which is to form the eye and enable it to be ultimately embraced thereby. This movement of the tip end is accomplished by the initial action of a sliding die K, Figs. 22, 23, and 24, which moves in a path at right angles to the path of die F and toward the abutment-die E, past the abutment-die C, at which point the upper hook a is developed. As the tip end of the wire is moved against the clamp I it is depressed by its sliding contact with a plate on said clamp, having a rounded or inclined projecting edge, located at the adjacent lower front corner of the clamp, and then an eye-forming die L, Figs. 29, 30, and 31, operates, it having a concave face, which, when said die is moved forward, engages with the upwardly-turned end of the wire of the blank and forms the eye, as clearly indicated in Figs. 32 and 33.

Figures 25, 26, 27, 28, 29, 30, 31, 32, 33:
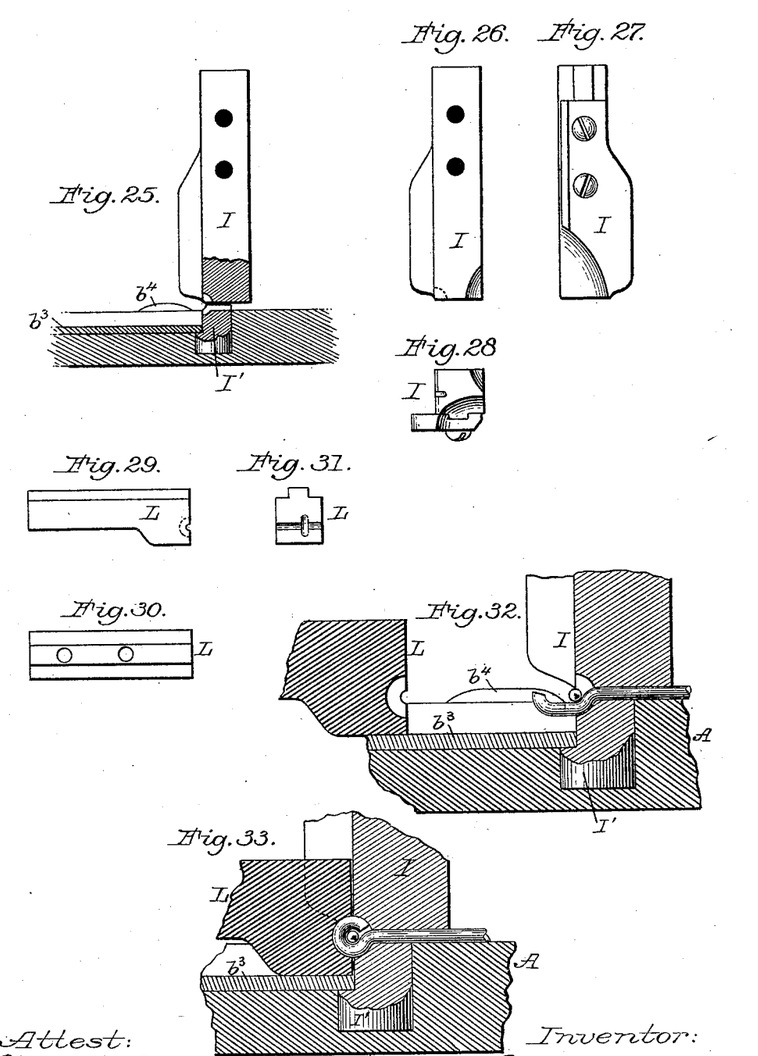
Fig. 25 in vertical section illustrates a portion of the head-block, an abutment-die, which also serves as a clamp-base on the head-block, and a clamping-die, serving with its base as parts of the eye-forming mechanism.
Figs. 26, 27, and 28 illustrate said clamping-die in two side views and bottom view.
Figs. 29, 30, and 31 illustrate the reciprocating eye-forming die in side, bottom, and end views.
Figs. 32 and 33 illustrate the clamp, its base, and the reciprocating eye-forming die as when initially clamping the wire, and also after the completion of the terminal eye.

Referring now to the head-block A, it will be seen from Figs. 7 and 8 that its upper surface occupies two horizontal planes, the division line being indicated by a helical curved line. The several abutment dies C, D, and E are on and project above the highest part of the block. A portion of the top of the clamp-base I' also projects above said highest surface; but another portion of said top is flush with said surface. Said clamp-base is cylindrical and is located on the curved line between said upper and lower surfaces in a hole in the head-block, and it has a horizontal surface below the lower surface of the head-block, as shown in Fig. 25, so that it may be held in its seat by the clamp-plate $b^3$ and its screws, the inner end of said plate overlying said horizontal lower portion of the base. At one side of the plate $b^3$ there is another plate $b^4$, Figs. 7 and 32, having an arched upper surface for lifting and guiding the tip end of the hook over the upwardly-turned wire at the eye end while being moved into contact with the clamp by the initial action of the sliding die K. It is to be understood that while the head-block should in most cases be a block separable from the adjacent portion of the frame of the machine it can obviously be integral with the frame, as when the abutment-dies are arranged to be themselves readily detachable from the block. After the hook has been completely formed, as described, it is released from the head-block by the withdrawing action of the dies F, H, I, K, and L, as will hereinafter be fully indicated.

Having thus described what may be termed the "vital" portions of my machine and the general mode of operation involved, it will be readily obvious that the several active elements may be actuated by variously-organized mechanism without materially affecting their efficiency in the performance of their respective duties.

Figure 34:
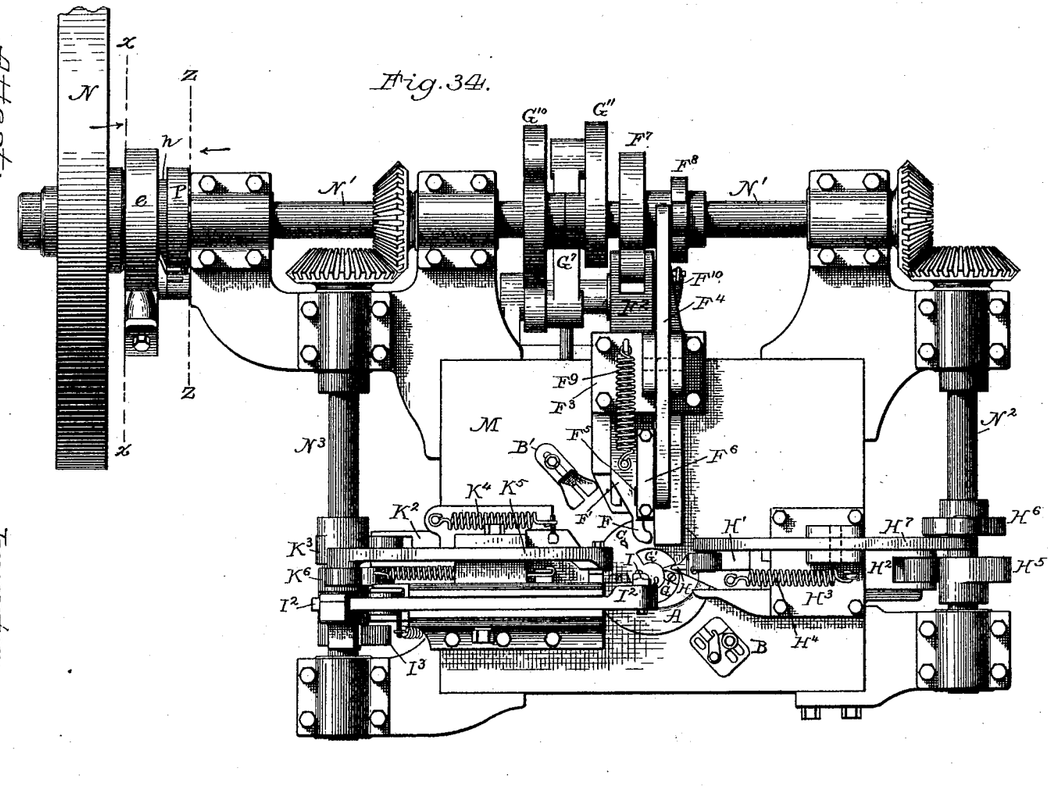
Fig. 34 is a top view of my machine.
Figure 35:
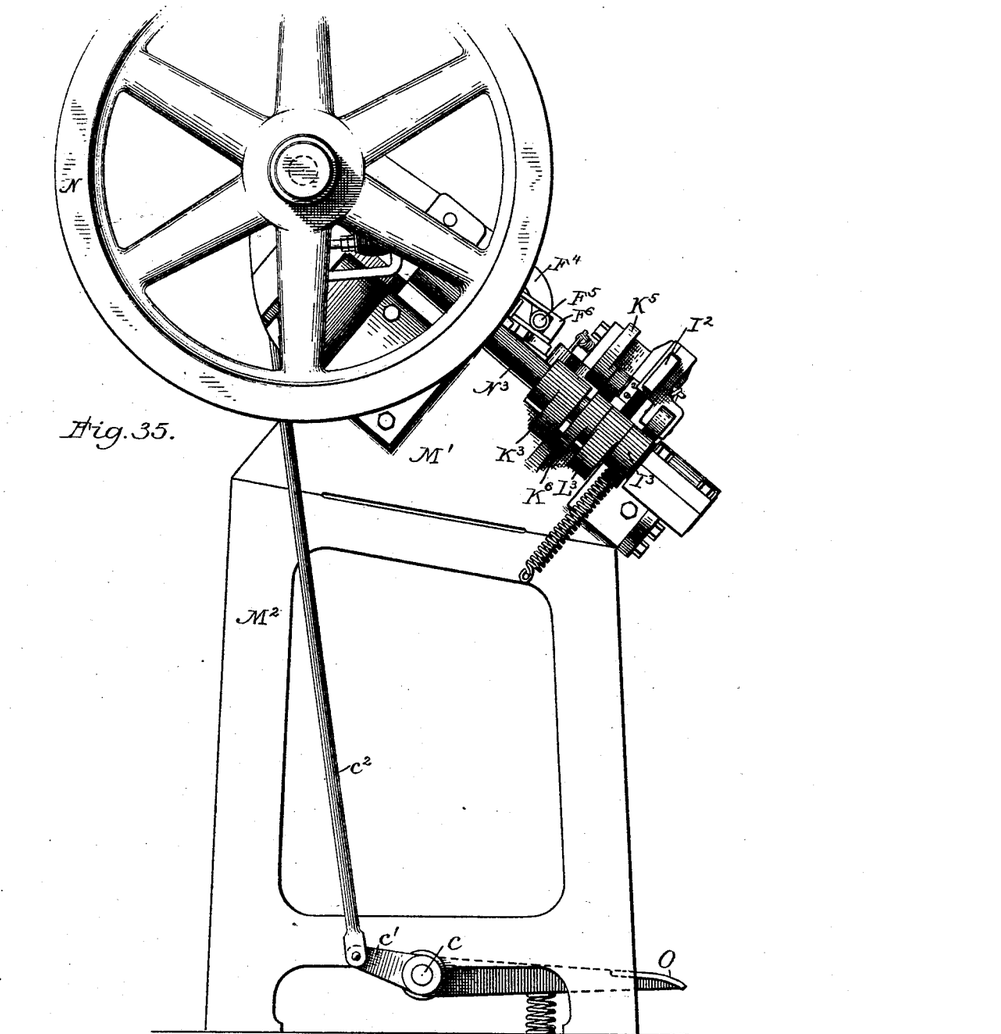
Fig. 35 is an end elevation.

In Figs. 34 and 35 I have shown my machine in plan and end views. The frame of the machine may be widely varied in its construction, provision being duly made to afford proper supports for the operative mechanism. The top plate M is inclined upwardly from its front to its rear, and in this instance it is integral with its vertical end plates M', which are triangular in form, and the whole is mounted on vertical standard-plates $M^2$. The head-block A is detachably mounted on the top plate, centrally, and near its lowest or front edge, and the inclination of said plate not only enables all the mechanism mounted thereon to be readily accessible to and observed by the operator, but the head-block being also inclined enables the prompt gravity discharge of the hooks as soon as they are released from the head-block.

Power is applied to the machine by means of a heavy belt-pulley N, loosely mounted on but clutched to the main shaft N', the latter being connected by beveled gearing to a pair of counter-shafts $N^2$ $N^3$, which are rectangular to the main shaft and respectively located at opposite ends of the machine, and they are inclined, so as to be parallel with the ends of the top plate. All of said shafting is mounted in suitable bracket-bearings projecting from the frame of the machine, as clearly indicated in Fig. 34.

Figure 36:
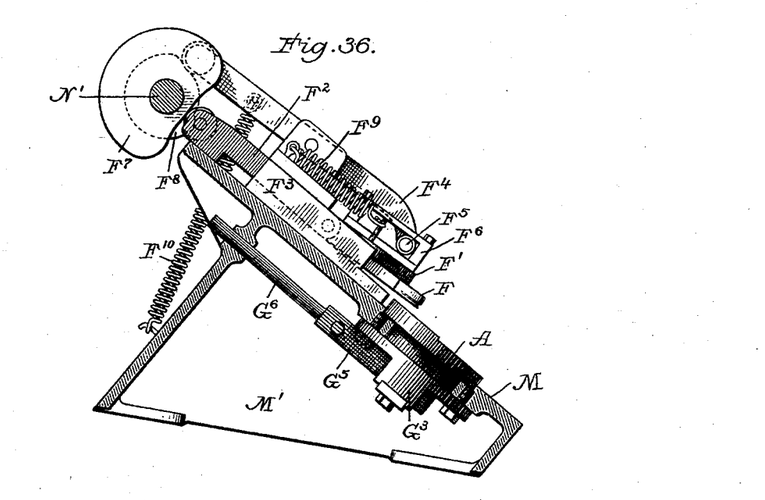
Fig. 36 is a vertical section of the top plate detached from the frame and a side view of the sliding die which is directly operated by the main shaft for executing the first bending operation, said shaft being shown in section with the cams which actuate said die. The head-block in this figure is not shown in section, and it is to be understood that the left-hand rear portion of the top plate is sectioned on two vertical lines.

The main driving-shaft N' is relied upon for directly operating the sliding die F, Figs. 34, 35, and 36. The die F is attached to the under side of a carrier F', which is pivoted to a tail-block $F^2$, having an anti-friction roller at its rear or outer end, and the whole slides in a guide-bearing $F^3$, mounted on the top plate M. Said die is maintained in a normally-retracted and elevated position, as clearly shown in Fig. 36, by means of one or more springs, and it is depressed during its forward movement by a lever $F^4$, which is pivoted on top of the guide-bearing $F^3$ and bears upon the die-carrier F' by means of a laterally-projecting stud and friction-roller $F^5$, which occupies a slot afforded by an overlaid strap $F^6$, secured to the carrier F'.

Figures 37, 38:
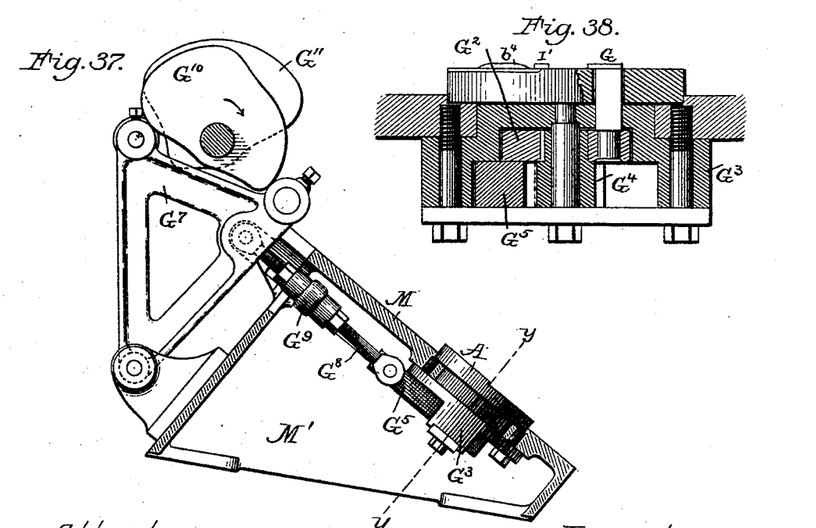
Fig. 37 is a similar vertical central section of the top plate detached from the frame and a side view of the head-block and the mechanism which actuates a die or wiper which moves in the arc of a circle, its path being a curved slot in the head-block.
Fig. 38 illustrates in vertical section on line $y$, Fig. 37, the head-block and the underlying mechanism.

On the main shaft N' there are two cams $F^7$ and $F^8$, closely adjacent to each other, and just before the cam $F^7$ begins to force the tail-block and the die forward the cam $F^8$ actuates the lever $F^4$ and depresses the die, so as to locate it in the plane occupied by the abutment-die C and enable it to engage with a wire blank when laid upon the head-block. During the forward movement of the die F it is maintained in its depressed position by the cam $F^8$, and so, also, after said forward movement has been completed, both cams being so shaped as to afford the rest required while the other dies are operating. By the time a hook is completed a quick-retiring face on the cam $F^8$ permits the rear end of the lever $F^4$ to fall and the die to promptly rise, this latter movement being effected by a pair of springs, one of which also pulls the die rearward, and this spring $F^9$ is coupled to a post on the guide-bearing and to the top of the die-carrier F'. Another spring $F^{10}$ is coupled to the rear end of the lever and to the frame of the machine, all as clearly indicated in Figs. 34 and 36. In thus rising the die F co-operates with all the other sliding dies in releasing a finished hook from the head-block A. The main shaft N' is also relied upon for directly actuating the wiper-die G, which has its path in the circularlycurved slot G' in the head-block. This die is firmly mounted upon a disk-shaped carrier $G^2$ below the head-block and rotative on an axis which is concentric with said block and rectangular to its upper surface. The said carrier is mounted in an underlying bracket $G^3$, as clearly indicated in Figs. 36, 37, and 38, and it has a pinion $G^4$ for its hub, and this is engaged by a reciprocating rack-gear $G^5$ for imparting to the carrier and its die the desired to-and-fro semi-rotative movements. The rack-gear $G^5$ has a guide-rod $G^6$, provided with a guide-bearing in the back or rear side of the top plate, as shown in Fig. 36, and it is coupled to a vertical triangular bell-crank lever $G^7$ (having at its foot a rock-shaft or stud below the main shaft N') by means of a pitman or link $G^8$, which is constructed in two parts having reversely-screw-threaded ends and united by a turn-buckle-sleeve $G^9$, thus enabling said pitman to be elongated or shortened for so adjusting the rack, the pinion, and the die G as to secure for the latter the precise requisite movements. Rocking motion is imparted to the bell-crank lever $G^7$ by means of two cams $G^{10}$ and $G^{11}$ on the main shaft, said lever having two contact-rollers in different vertical planes for engagement, respectively, by said cams, as clearly indicated in Figs. 34 and 37.

The main forward movement of the rack-gear is effected by the cam $G^{10}$ and the backward movement by the cam $G^{11}$ as follows: When in its normal position, the die G is at rest midway in its circular path, as indicated in Figs. 7 and 34. Its first movement is toward the rear end of the curved slot or path, where it rests. Its next movement is a full sweep toward and nearly to the front end of its curved path, where it again rests, as shown in Fig. 18, until the completion of a hook and after the lifting and retirement of the sliding dies, whereupon said die G resumes its central or normal position, where it again rests. It will be seen that these cams $G^{10}$ and $G^{11}$ are so shaped that by their alternating action they will impart to the die G the several movements and rests thus described.

The sliding die H is actuated by the counter-shaft $N^2$, which is revolved at the same speed as the main shaft N'. This die is specially shown in Fig. 39 in side view, as also in Fig. 34, and it is mounted on the under side of a carrier H', which is pivoted to a tail-block $H^2$, having a contact-roller at its rear end and sliding in a guide-bearing $H^3$, which is mounted on the top plate. A retractile spring $H^4$ is coupled to the die-carrier H' from a post on the bearing $H^3$ for not only maintaining it in a normally-elevated position, as shown, but also for retracting said die and tail-block when not forced forward by a cam $H^5$ on the counter-shaft $N^2$. As said die is moved forward it is also depressed by a cam $H^6$ actuating a lever $H^7$, which is pivoted on top of the guide-bearing $H^3$, and has at its front end a roller which bears upon a plate on top of the die-carrier H'. The cam $H^5$ is so shaped that it promptly forces the die forward to its bending work and then permits it to rest while it operates as an abutment-die in conjunction with the die G. The cam $H^6$ is so shaped that it depresses the die, beginning at its initial forward movement and continuing until the completion of a hook, whereupon its permits the spring $H^4$ to act with those of the other dies in releasing a finished hook from the head-block. The counter-shaft $N^3$ actuates the clamp I, the sliding die K, and the eye-forming die L, and these parts are of necessity intimately grouped. The clamp-die I in moving toward and from its base I' requires only a vertical movement, and hence it is mounted on a carrier-lever $I^2$, which is centrally pivoted in a standard on the top plate, and at its rear end it is provided with a strap carrying a contact-roller which is offset to the one side, as shown in Fig. 35, for engagement by the cam $I^3$, (on the counter-shaft $N^3$,) which is so shaped as to cause the clamping-die I to promptly operate in firmly holding the wire blank upon the die-base I' and to then rest until the completion of the hook, whereupon the cam permits a prompt releasing or lifting action, which is effected by a retractile spring $I^4$, coupled to the rear end of the die-lever and to a stud projecting from the frame of the machine.

Figure 39:
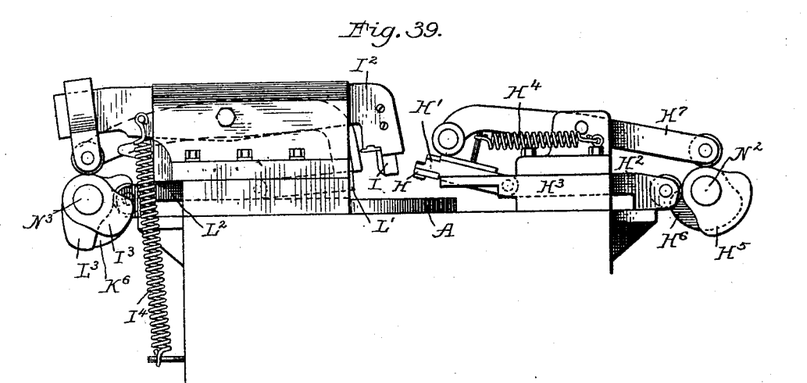
Fig. 39 in side view illustrates the head-block and the sliding die which executes the second bending operation and its accompanying mechanism, and said figure also illustrates in side view the clamping and eye-forming mechanism, and also the sliding die which executes the fourth and final bending operation.
Figure 40:
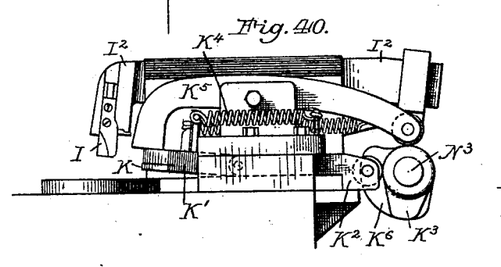
Fig. 40 illustrates in a side view opposite to that in Fig. 39 the die which executes the final bend and the clamping and eye-forming mechanism.
Figure 41:
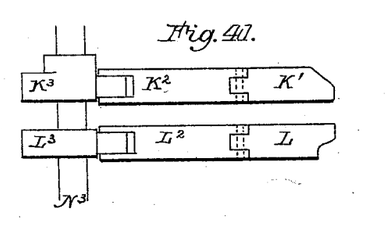
Fig. 41 is a top view of the sliding eye-forming die and the die which executes the final bending operation and their cams.

The sliding die K, by which the final bending operation is effected, lies parallel with the clamp-die lever $I^2$, but in a lower plane, as shown in Figs. 39 and 40, and it is mounted on a carrier K', which at its rear end is pivoted to a tail-block $K^2$, provided at its outer end with a contact-roller for engagement by a cam $K^3$ on the counter-shaft $N^3$, by which the die is driven forward to its work. This die, like the other sliding dies, is normally maintained in an elevated position by a retractile spring $K^4$, and it is depressed just prior to its forward movement by a lever $K^5$, pivoted on top of the guide-bearing (in which the die-carrier and tail-block slide) and having a contact-roller, which is engaged by the cam $K^6$ for forcing the die forward, the retractile movement being effected by said spring $K^4$. As before indicated, the initial action of the die K on the wire blank forces the tip end of a blank toward and against the already-depressed clamp-die I, said tip end being lifted over the eye end of the blank by passing in contact with and over the arched surface of the plate $b^4$, and on striking the front curved or inclined lower surface of the clamp-die I it is then guided downward slightly until in contact with the portion of the clamp-die base I' which projects above the surface of the head-block.

Figure 42:
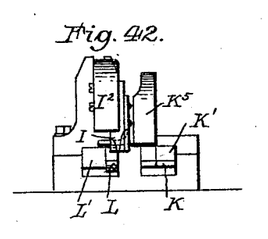
Fig. 42 is a front end view of the dies of Fig. 41 and a depressing-lever common to both dies.
Figure 43:
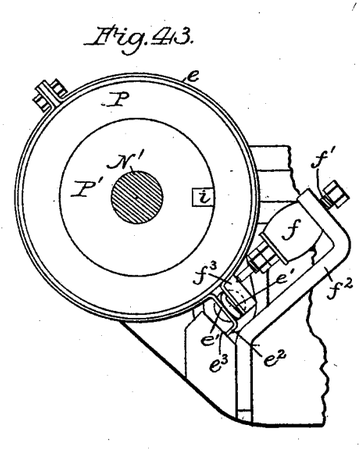
Fig. 43 is a section on line $x$, Fig. 34, for illustrating braking and stopping mechanism.
Figure 44:
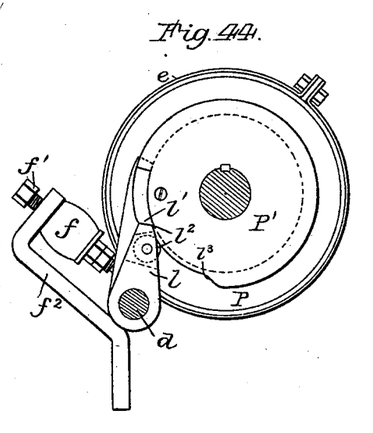
Fig. 44 is a section on line $z$, Fig. 34, illustrating stopping and starting mechanism.
Figure 45:
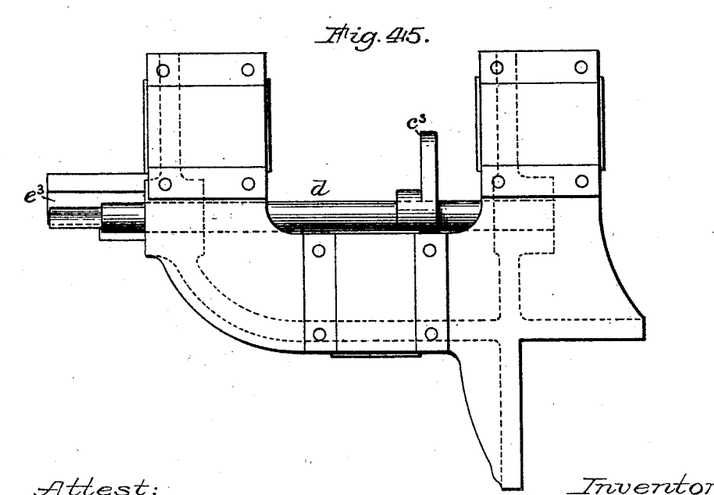
Fig. 45 is a top view of a complex bracket adjacent to the driving-pulley and a rock-shaft by which the stopping, starting, and braking mechanism is controlled.
Figure 46:
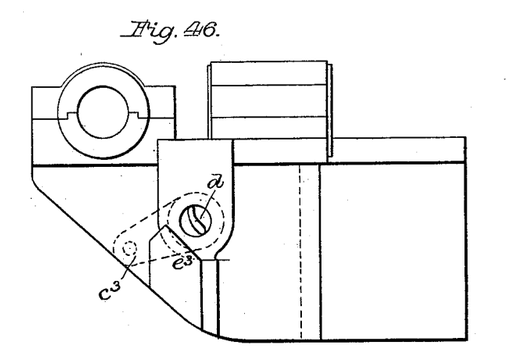
Fig. 46 is an end view of said bracket and the said rock-shaft.
Figure 47:
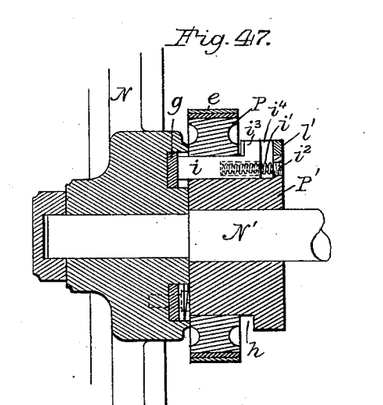
Fig. 47 is a diametrical longitudinal section of the hub of the driving-pulley, clutch, and brake.
Figure 48:
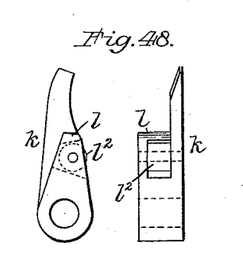
Fig. 48 is a view of a clutch-releasing arm detached.
Figure 49:
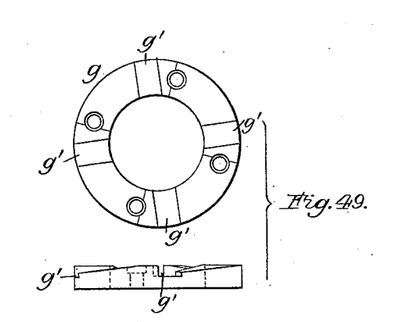
Fig. 49 in side and edge views illustrates a clutch-face on the hub of the driving-pulley.

Closely following the initial action of the die K the eye-forming die L commences its forward movement. This die is directly beneath the clamp-die lever $I^2$, and it is mounted on a carrier L', which at its rear end is pivoted to a tail-block $L^2$, having at its outer end a contact-roller, which is engaged by the cam $L^3$ on the counter-shaft $N^3$ for forcing the die forward against the retractile action of the spring $L^4$, which not only retracts the die, but also normally maintains it in an elevated position. The depression of this die is effected by the lever $K^5$, before described, which bears upon both of the die-carriers $K'$ and $L'$, as clearly indicated in Fig. 42. The cam $L^3$ is so shaped that after the die L has been forced fully forward for completing the eye said die, in common with all the rest, will be quickly released and be promptly lifted.

From the description thus far given it will be obvious that a hook will be completed and released during and by each complete revolution of the main shaft, and it is deemed essential in a hand-fed machine that said main shaft should be intermittingly revolved, so as to afford a dead-stop after each revolution in view of the absolute importance of placing the blanks upon the head-block with precise accuracy. I have therefore so organized my machine that the driving-pulley is continuously driven, and said pulley is quite heavy, so as to serve effectively as a balance-wheel for better overcoming the inertia of the main shaft and driving it at desirable speed throughout each revolution. The driving-pulley and the main shaft are coupled by means of a spring-actuated clutch, which is controlled by a treadle in such a manner that the operator by applying his foot to the treadle releases the main shaft from its stop mechanism and permits the clutch to engage with the driving-pulley, and then while the treadle is relieved from pressure the clutch is permitted to operate automatically in its release from engagement with the driving-pulley, and the stopping mechanism also operates automatically as soon as the main shaft has completed its one revolution.

In order that undue rotative impetus in the main shaft may be well controlled, I have applied thereto a friction-brake, which is normally set for duty, but is released by the depression of the treadle and is promptly applied or set again just prior to the complete stoppage of the main shaft.

The starting, stopping, and braking mechanism connected with the main shaft is illustrated in detail in Figs. 43 to 49, inclusive. Commencing with the treadle O of Fig. 35, it is to be understood that it is secured at its rear end to a rock-shaft $c$, and that it may or may not be provided with a spring of its own for normally maintaining its front or treadle end in an elevated position. The rock-shaft $c$ has a rearwardly-projecting arm $c'$, to which a vertical rod $c^2$ is pivoted for connecting the treadle with an arm $c^3$, which projects rearwardly from a rock-shaft $d$, which is below and parallel with the main shaft, and has its bearings in the complex bracket, Figs. 45 and 46, in which said main shaft has its bearings adjacent to the driving-pulley. A slight forward rotation of this rock-shaft (resulting from the depression of the treadle) first releases the friction-brake, which consists of a band $e$, lined with leather to serve as a friction-pad, and constructed in two similar parts semicircular in form and bolted together. This band is composed of steel and is, in fact, a spring, which, by means of its pad, snugly engages with the periphery of a brake-hub P, and at one side the ends of the two parts are each extended outwardly to afford free ends to the band-spring. These free portions have straight or flat coincident faces $e'$, and one of them at its extreme end is turned backward at right angles to the adjacent face $e'$ to afford an abutting face $e^2$, which engages with a shoulder $e^3$ on the hanger or bracket in which the rock-shaft $d$ is mounted. As clearly shown in Fig. 43, said rock-shaft at one end is cut away on its two sides, so as to afford two flat faces, which are interposed between the two flat faces $e'$ of the spring, so that when said shaft is rocked or semi-rotated said spring-faces will be separated and the band-spring released from its braking contact with the hub P. The braking force of the band-spring is largely supplemented by a heavy adjustable rubber spring $f$, mounted on an adjusting-spindle $f'$, guided at its outer end in a bracket $f^2$ and at its lower end bearing against a step-block $f^3$, which is connected with the true free end of the band-spring, thus not only affording a heavy braking effect, but also in whole or in part causing the rock-shaft and the treadle to promptly resume their normal or inoperative positions. The brake-hub P is mounted securely upon a clutch $P'$, which is keyed to the main shaft. The loose driving-pulley has secured to and at the inner end of its hub a clutch-plate $g$, as clearly shown in Figs. 47 and 49, which is provided with four radial slots $g'$, each having one abrupt clutch-shoulder, and the surfaces between the slots are inclined in a manner common to clutch-faces. The clutch-hub $P'$ is larger at one end than at that portion on which the brake-hub is mounted for affording alongside the brake-hub an annular groove $h$.

At one side of the clutch-hub $P'$, at its periphery, a longitudinal slot is cut, so that when the brake-hub has been secured in position a guide-bearing is afforded for the reception of a sliding clutch-bolt $i$, which is internally chambered for the reception of an expansive spiral spring $i'$, abutting at its outer end against the inner end of an adjusting-screw $i^2$, which extends inward from the end of the clutch-hub. The clutch-bolt has at its outer end a rectangular head $i^3$, which projects toward the periphery of the clutch-hub, and it partially occupies the groove $h$ crosswise when the bolt is on duty; but when said bolt is retracted its head wholly occupies a retiring recess $i^4$ provided therefor in the clutch-hub, as clearly indicated in Fig. 47. The inner vertical side of the bolt-head $i^3$ is inclined to afford a latch-face for engagement by a clutch-releasing pawl or finger $k$, which has a chisel-shaped tip and projects from a stop-pawl $l$, keyed to the rock-shaft $d$, so that said finger, when occupying said groove $h$, will, on being struck by said latch-face, cause the retraction of the clutch-bolt. The periphery of the clutch-hub P' outside of the groove $h$ is provided with a hardened-steel abutment-block $l'$, one end of which engages with the end of the stop-pawl $l$ in stopping the main shaft after the release of the clutch. The stop-pawl $l$ has an anti-friction roll $l^2$, which enables the pawl to ride freely on the periphery of the clutch-hub while the main shaft is revolving; but said periphery is cam-shaped at $l^3$ in front of the abutment end of the block $l'$, so that as the shaft and hub revolve with the stop-pawl riding on the hub said pawl will be permitted to drop its end, so as to be at once engaged by the end of the abutment-block, thus stopping the main shaft, the shock of the sudden stoppage being materially modified by the compressing action of the brake, which follows promptly after the cam-shaft is permitted to rock, and to automatically apply the brake as a result of the passing upon the cam-surface $l^3$ by the pawl-roller $l^2$. It will now be readily understood that after a wire blank has been placed upon the head-block and the treadle depressed for a moment the brake will be released and the clutch-bolt be free to at once enter that one of the clutch-slots which shall next arrive opposite the bolt and cause the main shaft to commence its rotation, and also that, the treadle being then released from pressure, the clutch-releasing finger and the stop-pawl will then ride upon the periphery of the hub during the one revolution of the main draft required for finishing a hook, and that just prior to the completion of the said revolution the brake will be automatically set, followed by the automatic operation of the stop-pawl.

Now, referring to the head-block and to the several active and inactive dies, it will be obvious that any one complete organization thereof can only be relied upon for producing not only one general form of hook, but also one size thereof, and that for larger hooks of the same precise form another head-block and other dies must be employed, and also that for producing hooks varying in form corresponding variations must be made in the dies. In all cases, however, a gaging device must be employed to enable a straight-wire blank to be accurately located upon the head-block in such a position that it may be efficiently engaged by the die which effects the first bend.

The best economic results will generally accrue from the use of a machine capable of doing the entire duty of the machine described; but it will be obvious that substantially valuable results will accrue from the use of two or more machines in series, each containing only such dies as will, for instance, develop a blank from some one of the several forms shown to the next succeeding form.

Figure 50:
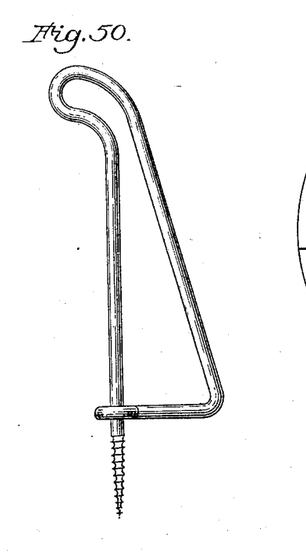
Fig. 50 illustrates a single hook as distinguished from the double hook of Fig. 1.
Figure 51:
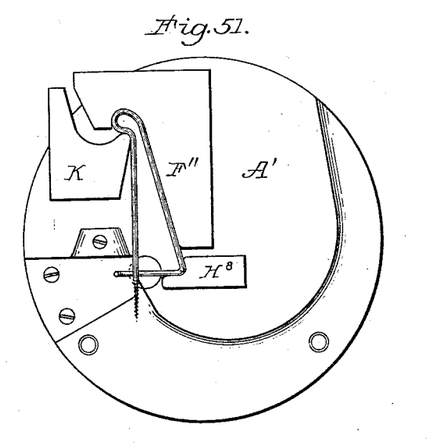
Fig. 51 illustrates a head-block and dies for producing said single hook.

In the manufacture of hooks which are single, as distinguished from the double hooks, thus far considered, it is obvious that either of two of the movable dies may be dispensed with—as, for instance, I will now refer to the single hook disclosed in the patent issued to me, No. 280,388, dated July 3, 1883, and illustrated in Fig. 50. For producing this hook the head-block and the requisite dies may be arranged as shown in Fig. 51. In this case the head-block A' has one abutment-die, parts of which are the same in effect as the abutment-dies C and E, previously described. The sliding die $F^{11}$ is the die F modified in form, and the die $H^8$ is a modification of the die H, these parts being ample for developing the blank into the form shown in Fig. 51, after which the clamp I, the sliding die K, and the eye-forming die L, before described, can be relied upon for finishing the hook.

Figure 52:
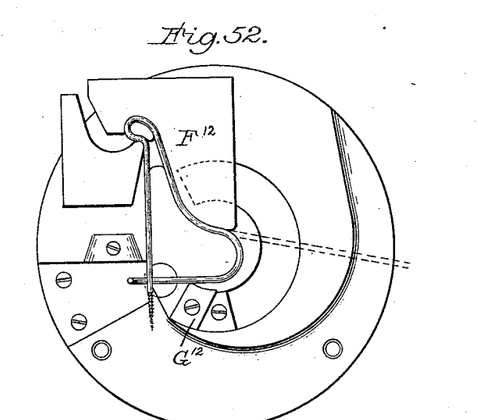
Fig. 52 illustrates a head-block and dies for forming such a single hook as is therewith indicated.

In making a single hook somewhat varied in its form, as illustrated in Fig. 52, the die $F^{12}$ will be used for effecting the first bend and the wiper-die $G^{12}$ employed for developing the base of the hook, as with the die G, previously described, the finishing operations being performed by a clamp and dies, as in making the double hook.

Having thus described my invention, I claim as new and desire to secure by Letters Patent—

1. In a machine for making double wardrobe-hooks composed of wire, the combination, substantially as hereinbefore described, of a head-block having abutment-dies thereon for determining the interior contour of a double hook, a sliding die co-operating with an abutment-die for partially forming two hooks, a second sliding die which operates as a bending-die for partially forming the lower of the two hooks and then as an abutment-die, a third movable die which co-operates with said second die first as an abutment and then as a bending-die for completing said lower hook, a fourth die which co-operates with the first die and with the adjacent abutment-dies for completing the upper hook, and the clamping-die and eye-forming die for developing at one terminal of the wire an eye which embraces the other terminal near its tip.

2. In a machine for bending wire in the formation of wardrobe-hooks, the combination, substantially as hereinbefore described, of a head-block having thereon stationary abutment-dies which serve as formers for determining a portion of the interior contour of a hook, a pair of dies moving in paths at right angles to each other and co-operating with said abutments for forming the arm of a hook, and a movable die which bends and forms the base of a hook.

3. In a machine for bending wire in the formation of double wardrobe-hooks, the combination, substantially as hereinbefore described, of a head-block having thereon two stationary abutment-dies, a sliding die co-operating with one of said abutment-dies for partially forming an upper hook and also co-operating with the second of said abutment-dies for partially forming a lower hook, a sliding die movable at right angles to the first sliding die and co-operating with said second abutment-die, and a third die operating as an abutment-die for still further partially forming the said lower hook.

4. In a machine for bending wire in the formation of double wardrobe-hooks, the combination, substantially as hereinbefore described, of a head-block having thereon two stationary abutment-dies, a sliding die co-operating with said abutment-dies for partially forming an upper and a lower hook, a second sliding die which operates first as a bending-die and then as an abutment-die for partially forming said lower hook, and a third movable die for completing said lower hook and developing the base of the double hook.

5. In a machine for bending wire in the formation of double wardrobe-hooks, the combination, substantially as hereinbefore described, of a head-block having thereon three stationary abutment-dies, a sliding die co-operating with two of said stationary dies for partially forming two hooks, a second sliding die which operates first as a bending-die and then as an abutment-die in the partial formation of a lower hook, a third movable die which completes said lower hook and develops the base of the double hook, and a fourth sliding die operating at right angles to the first-named sliding die and co-operating with two of said abutment-dies for finishing the upper hook.

6. In a machine for making wardrobe-hooks composed of wire, the combination, substantially as hereinbefore described, of a head-block having thereon a stationary abutment-die which serves as a former for determining the interior contour of a wire hook, a pair of dies moving in paths at right angles to each other and co-operating with a portion of said abutment die for developing the arm or main portion of the hook, a third movable die co-operating with another portion of said abutment-die for forming the base of the hook, a clamp, and an eye-forming die for developing a terminal eye which embraces the shank of the hook at its junction with said base.

7. In a machine for bending wire in the formation of wardrobe-hooks, the combination, substantially as hereinbefore described, of a head-block having thereon abutment-dies which determine the interior contour of a hook, movable dies for bending the wire, a driving-shaft from which power is derived for actuating said movable dies once during each revolution of said shaft, a driving-pulley loose on said driving-shaft, a spring-actuated clutch for coupling the pulley and shaft, a spring-actuated friction-brake on said shaft, a rock-shaft controlling said brake, a clutch-pawl on said rock-shaft for controlling the clutch, a stop-pawl on said rock-shaft for abruptly stopping the driving-shaft after each revolution, a treadle-lever for rocking said rock-shaft in one direction for releasing the brake and lifting the stop-pawl and also lifting the clutch-pawl for permitting the clutch to operate, and a spring for rocking said rock-shaft in the opposite direction at the completion of each revolution of the main shaft for automatically setting the brake, releasing the clutch, and stopping the driving-shaft.

8. In a machine for bending straight wire blanks in the formation of wardrobe-hooks, the combination, with a head-block having thereon stationary abutment-dies for co-operation with movable bending-dies, of a gage in two parts, respectively located at opposite sides of said block, one of said parts having a laterally-movable clamping-jaw for receiving and holding one end of a wire blank and permitting it to be freely moved laterally therefrom, the other of said parts having a funnel-shaped form, but open at one side at its base for receiving the opposite end of the blank and permitting said end to be freely moved laterally from said base and in a direction opposite to that in which the other end of the blank can move, substantially as described, whereby a wire blank may be accurately adjusted crosswise of the head-block in proper relation to the abutment-dies and the two ends of the blank be free to move laterally in opposite directions during the bending operations.

9. In a machine for bending straight wire blanks in the formation of double wardrobe-hooks, the combination of a head-block having two abutment-dies thereon, a gage for adjusting a blank crosswise on said block, and a sliding die co-operating with said abutment-dies for developing a straight wire blank into a blank embodying a partially-developed upper or main hook, and having a curved portion extending therefrom to the interior of a second or lower hook, the remaining portions of the blank being left straight and pointing in opposite directions.

PURCHES MILES.

Witnesses:
C. T. STORK,
A. A. FONDO.